US012346058B2

(12) United States Patent
Lee et al.

(10) Patent No.: US 12,346,058 B2
(45) Date of Patent: Jul. 1, 2025

(54) PROCESS CARTRIDGE WITH TONER RECEIVING UNIT ALONG PIVOT AXIS OF DEVELOPMENT UNIT

(71) Applicant: Hewlett-Packard Development Company, L.P., Spring, TX (US)

(72) Inventors: Sanghoon Lee, Gyeonggi-do (KR); Junhui Kim, Gyeonggi-do (KR); Donguk Kim, Gyeonggi-do (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/698,767

(22) PCT Filed: Mar. 10, 2022

(86) PCT No.: PCT/US2022/071067

§ 371 (c)(1),
(2) Date: Apr. 4, 2024

(87) PCT Pub. No.: WO2023/069794

PCT Pub. Date: Apr. 27, 2023

(65) Prior Publication Data

US 2024/0427283 A1 Dec. 26, 2024

(30) Foreign Application Priority Data

Oct. 18, 2021 (KR) ........................ 10-2021-0138616

(51) Int. Cl.
*G03G 21/00* (2006.01)
*G03G 21/18* (2006.01)

(52) U.S. Cl.
CPC . *G03G 21/1825* (2013.01); *G03G 2221/1861* (2013.01)

(58) Field of Classification Search
CPC ........... G03G 15/0865; G03G 15/0877; G03G 15/0879; G03G 15/0896; G03G 21/1825; G03G 2221/1861
See application file for complete search history.

(56) References Cited

U.S. PATENT DOCUMENTS 9,122,240 B2 * 9/2015 Hashimoto ........ G03G 21/1676
2016/0282759 A1 * 9/2016 Matsumoto ........ G03G 15/0879
2016/0291506 A1 * 10/2016 Sato .................. G03G 21/1676
(Continued)

FOREIGN PATENT DOCUMENTS

EP 3282321 A1 2/2018
JP 2006113137 A * 4/2006
(Continued)

*Primary Examiner* — Robert B Beatty
(74) *Attorney, Agent, or Firm* — Foley & Lardner LLP

(57) ABSTRACT

A process cartridge (2) includes: a photosensitive unit (100) including a photosensitive drum (21); and a development unit (200). The development unit includes: a developing roller (22); a toner chamber (203); a toner receiving unit (300) extending from the toner chamber to form a toner supply path (302) to the toner chamber; and a toner inlet (301) provided in the toner receiving unit. The development unit comprising the toner receiving unit is pivotably supported by the photosensitive unit, the development unit pivotable in a direction in which the developing roller approaches or is separated from the photosensitive drum.

12 Claims, 12 Drawing Sheets

(56) References Cited

U.S. PATENT DOCUMENTS

| | | | | |
|---|---|---|---|---|
| 2020/0103820 | A1* | 4/2020 | Sato .................. | G03G 15/0879 |
| 2021/0080859 | A1 | 3/2021 | Matsumaru et al. | |
| 2021/0080870 | A1 | 3/2021 | Maeda et al. | |
| 2021/0080898 | A1 | 3/2021 | Takeuchi et al. | |
| 2022/0214632 | A1* | 7/2022 | Son .................... | G03G 21/1676 |

FOREIGN PATENT DOCUMENTS

| | | | | |
|---|---|---|---|---|
| JP | 2009300859 | A | * | 12/2009 |
| JP | 2011197291 | A | * | 10/2011 |
| WO | 2021/040782 | A1 | | 3/2021 |

* cited by examiner

PROCESS CARTRIDGE WITH TONER RECEIVING UNIT ALONG PIVOT AXIS OF DEVELOPMENT UNIT

CROSS-REFERENCE TO RELATED APPLICATIONS

This application is a National Stage Application under 35 U.S.C. § 371 of PCT/US2022/071067, filed Mar. 10, 2022, which claims priority to Korean Patent Application No. 10-2021-0138616, filed Oct. 18, 2021, which are hereby incorporated by reference in their entireties.

BACKGROUND

An image forming apparatus using an electrophotographic method forms a visible toner image on a photoconductor by supplying toner to an electrostatic latent image formed on the photoconductor, transfers the toner image to a print medium directly or through an intermediate transfer medium, and then fixes the transferred toner image to the print medium.

A process cartridge contains toner and supplies the toner to the electrostatic latent image formed on the photoconductor to form a visible toner image. When the toner contained in the process cartridge is used up, the process cartridge may be removed from a main body of the image forming apparatus, and a new process cartridge may be mounted on the main body. Toner may be supplied from a toner cartridge to the process cartridge. The toner cartridge is connected to the process cartridge by a toner supply portion. A stable connection between the toner supply portion and the process cartridge is desired.

DETAILED DESCRIPTION

Figure 1:
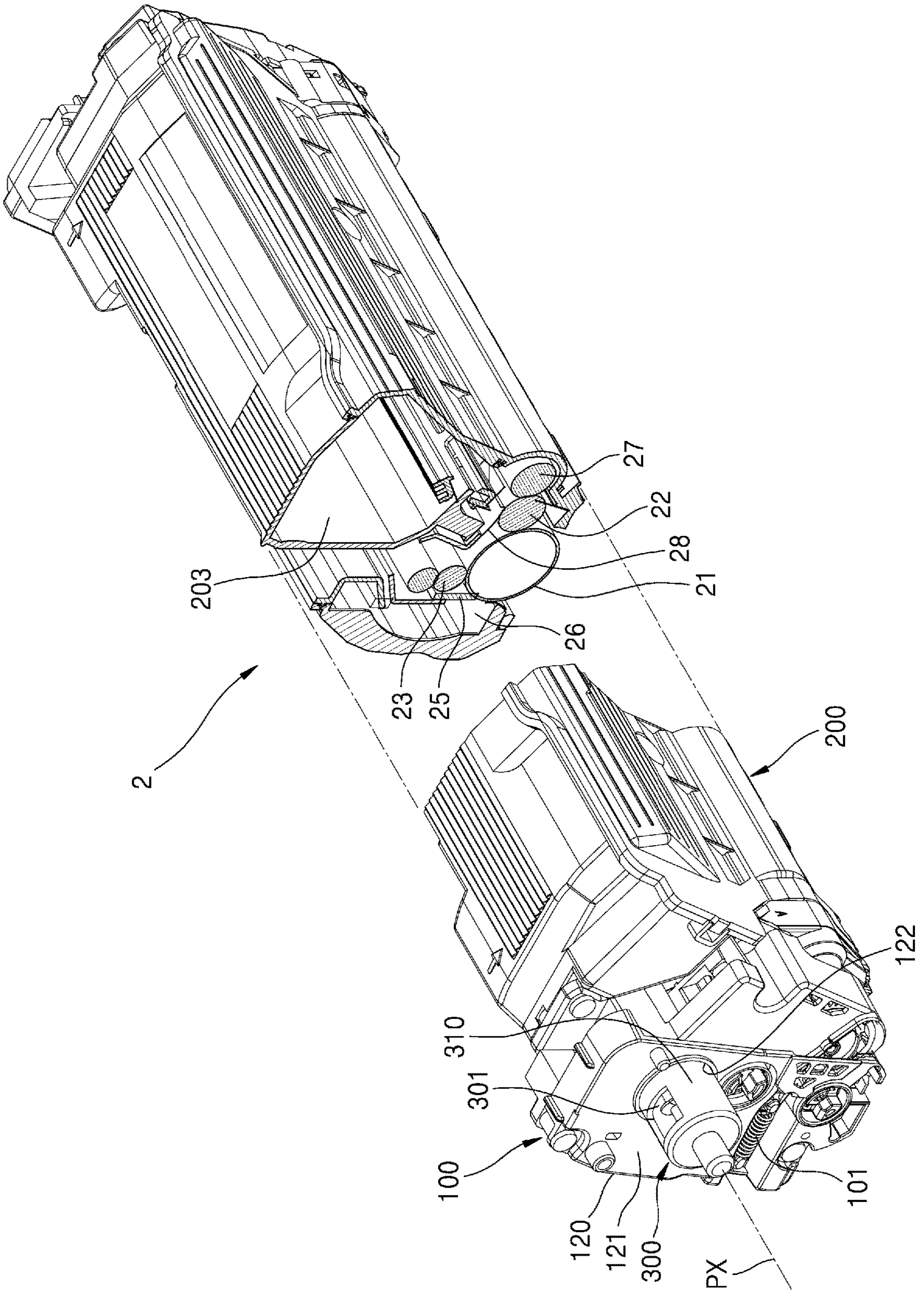
FIG. 1 is a schematic perspective view of an example of a process cartridge.

An image forming apparatus includes a replaceable process cartridge. The process cartridge may include a photosensitive drum and a developing roller. The process cartridge may be attached to or detached from a main body of the image forming apparatus. The process cartridge may include a photosensitive unit including the photosensitive drum, and a development unit including the developing roller. The development unit contains toner, and the developing roller supplies the toner to an electrostatic latent image formed on the photosensitive drum to develop the electrostatic latent image into a visible toner image. The development unit may be pivoted in a direction in which the developing roller approaches or is separated from the photosensitive drum. For example, an image forming operation may be performed while the developing roller is in contact with the photosensitive drum, and the developing roller may be separated from the photosensitive drum while no image forming operation is performed. Toner may be supplied from a toner cartridge to the development unit. The toner cartridge may be connected to the development unit by a toner supply portion. The development unit is provided with a toner receiving unit connected to the toner supply portion when the process cartridge is mounted on the main body. A structure in which a stable connection between the toner supply portion and the toner receiving unit may be maintained even when the development unit is pivoted with respect to the photosensitive unit is desired.

The process cartridge of some examples includes a photosensitive unit including a photosensitive drum, and a development unit including a developing roller. The development unit is pivotably supported by the photosensitive unit in a direction in which the developing roller approaches or is separated from the photosensitive drum. The development unit includes a toner chamber and a toner receiving unit extending from the toner chamber to form a toner supply path from outside to the toner chamber. The development unit with the toner receiving unit may be pivotably supported by the photosensitive unit.

As an example, the toner receiving unit may include an outer circumference portion protruding outward from a side portion of the photosensitive unit and having a cylindrical shape centered on a pivot axis of the development unit. A toner inlet may be provided in the outer circumference portion. As an example, a cover portion may be provided in the side portion of the photosensitive unit. The outer circumference portion of the toner receiving unit may be pivotably inserted into the cover portion. A toner supply hole aligned with the toner inlet may be provided in the cover portion. As an example, the toner receiving unit may include an opening portion exposed from the side portion of the photosensitive unit, and an extension portion extending from the opening portion into the toner chamber. The toner inlet may be provided near an end portion of the extension portion, the end portion being located inside the toner chamber. A shutter for opening and closing the toner inlet may be provided in the extension portion.

A development cartridge of some examples may include a side bracket, a toner chamber including a developing roller, a toner receiving unit extending from the toner chamber to form a toner supply path to the toner chamber, and a toner inlet provided in the toner receiving unit. The toner chamber may be pivotably supported by the side bracket with respect to the toner receiving unit. As an example, the toner receiving unit may include an outer circumference portion protruding outward from a side portion of the side bracket and having a cylindrical shape centered on a pivot axis of the toner chamber. The toner inlet may be provided in the outer circumference portion. As an example, the toner receiving unit may include an opening exposed from the side portion of the side bracket, and an extension portion extending from the opening into the toner chamber. The toner inlet may be provided near an end portion of the extension portion, the end portion being located inside the toner chamber.

An image forming apparatus of some examples may include a photosensitive drum, a development unit, a toner cartridge, and a toner supply unit. The development unit may include a developing roller, a toner chamber, a toner receiving unit extending from the toner chamber to form a toner supply path to the toner chamber, and a toner inlet provided in the toner receiving unit. The toner supply unit receives toner from the toner cartridge and supplies the toner to the toner chamber through the toner inlet. The development unit may be pivoted with the toner receiving unit in a direction in which the developing roller approaches or is separated from the photosensitive drum.

As an example, the image forming apparatus may include a photosensitive unit including a photosensitive drum, and the development unit may be pivotably supported by the photosensitive unit. The photosensitive unit and the development unit may form a replaceable process cartridge. As an example, the image forming apparatus may include a side bracket pivotably supporting the development unit with respect to the toner receiving unit. The development unit and the side bracket may form a replaceable development cartridge. Hereinafter, examples of a process cartridge, a development cartridge, and an image forming apparatus will be described with reference to the accompanying drawings. In the drawings, the same reference numerals refer to the same components, and the size or thickness of each component may be exaggerated for clarity of description.

Figure 2:
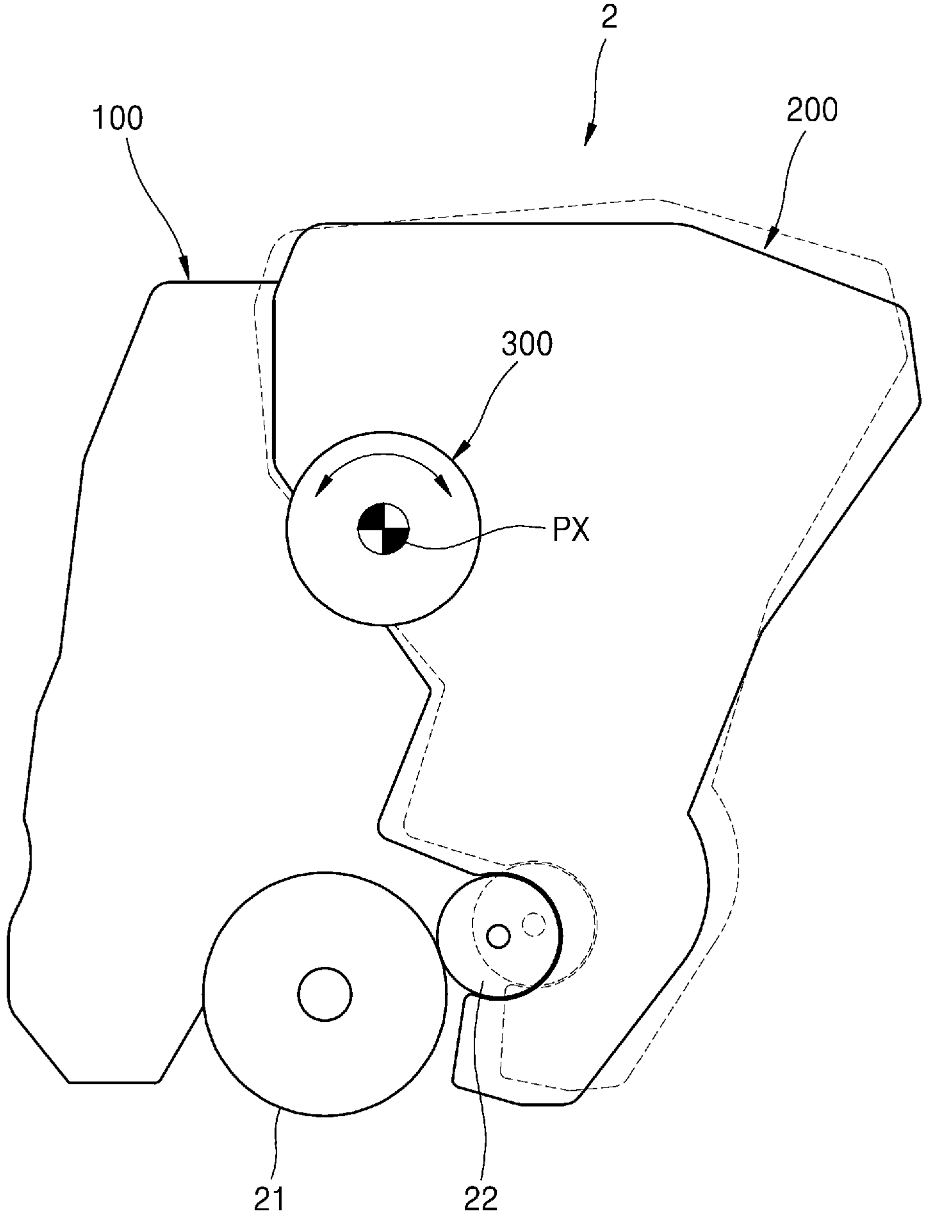
FIG. 2 is a side view of an example of the process cartridge shown in FIG. 1.
Figure 3:
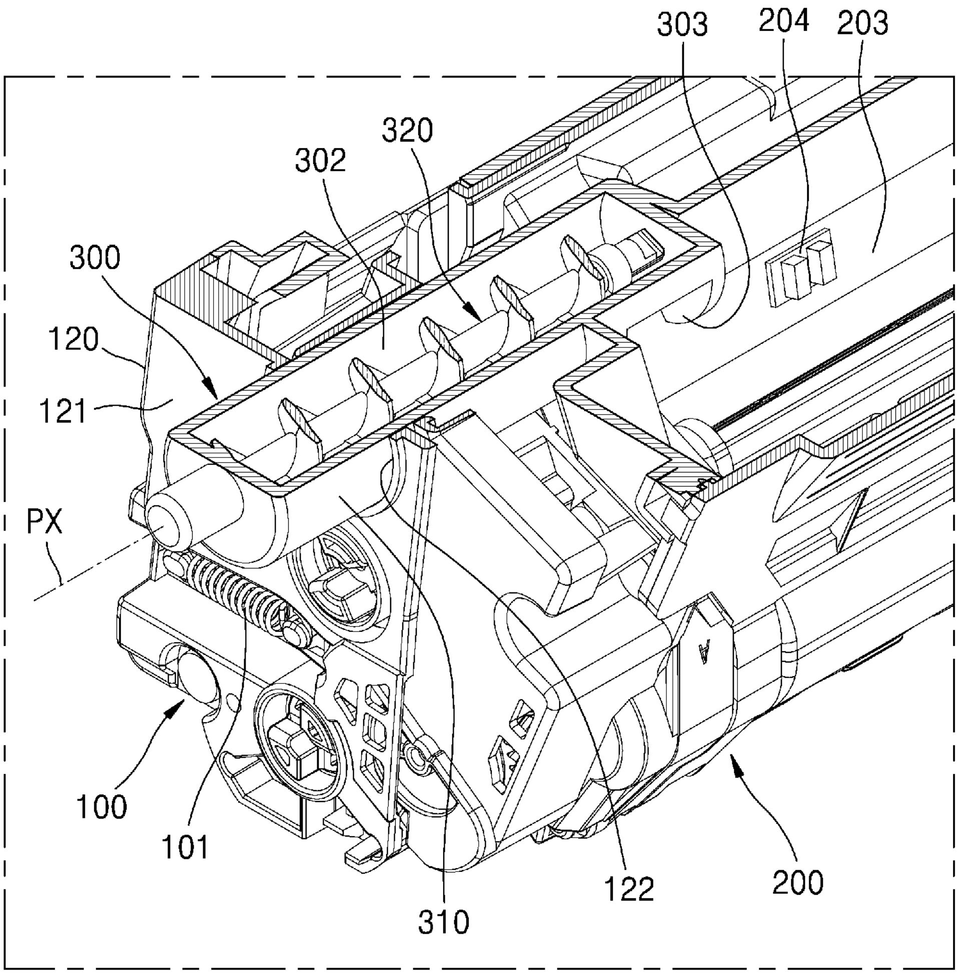
FIG. 3 is a partial cutaway perspective view of an interior of a toner receiving unit.

FIG. 1 is a schematic perspective view of an example of a process cartridge 2. FIG. 2 is a side view of an example of the process cartridge 2 shown in FIG. 1. FIG. 3 is a partial cutaway perspective view of an interior of a toner receiving unit 300. Referring to FIGS. 1 to 3, the process cartridge 2 may include a photosensitive unit 100 and a development unit 200. The photosensitive unit 100 may include a photosensitive drum 21. The development unit 200 may include a developing roller 22, a toner chamber 203, the toner receiving unit 300 extending from the toner chamber 203 to form a toner supply path 302 from outside to the toner chamber 203, and a toner inlet 301 provided in the toner receiving unit 300. The development unit 200 may be pivotably supported by the photosensitive unit 100 with the toner receiving unit 300 in a direction in which the developing roller 22 approaches or is separated from the photosensitive drum 21.

The photosensitive drum 21 is an example of a photoconductor having a surface on which an electrostatic latent image can be formed. A charging roller 23 charges the surface of the photosensitive drum 21 to a uniform electric potential. A cleaning blade 25 removes foreign substances such as waste toner remaining on the surface of the photosensitive drum 21 after a transfer process described below. The foreign substances removed from the surface of the photosensitive drum 21 may be contained in a waste toner receiving unit 26.

Toner is contained in the toner chamber 203. The developing roller 22 is partially exposed from the toner chamber 203, and the exposed portion of the developing roller 22 faces the photosensitive drum 21. For example, the exposed portion of the developing roller 22 may come into contact with the photosensitive drum 21 to form a developing nip. The developing roller 22 supplies the toner contained in the toner chamber 203 to the electrostatic latent image formed on the surface of the photosensitive drum 21 to develop the electrostatic latent image into a visible toner image. A developing bias voltage for attaching the toner to the photosensitive drum 21 may be applied to the developing roller 22. A supply roller 27 attaches the toner inside the toner chamber 203 to the developing roller 22. A supply bias voltage for attaching the toner to the developing roller 22 may be applied to the supply roller 27. A thickness of a toner layer attached to an outer circumference of the developing roller 22 and supplied to the developing nip is regulated by a regulating blade 28.

The development unit 200 includes the toner receiving unit 300. The toner receiving unit 300 extends from the toner chamber 203. The toner receiving unit 300 forms the toner supply path 302 for supplying, for example, toner discharged from a toner cartridge 40 (described below) to the toner chamber 203. The toner receiving unit 300 is provided with the toner inlet 301 through which toner is introduced. When the process cartridge 2 is mounted on a main body 1 (of FIG. 4) of an image forming apparatus, a toner supply unit 50 (of FIG. 4) may be connected to the toner receiving unit 300, and toner contained in the toner cartridge 40 may be introduced into the toner receiving unit 300 through the toner inlet 301 to be supplied to the toner chamber 203. A toner conveying member 320 may be provided inside the toner receiving unit 300. The toner conveying member 320 conveys the toner introduced into the toner receiving unit 300, for example, the toner supply path 302, through the toner inlet 301 to the toner chamber 203. The toner conveying member 320 may include, for example, an auger. The toner conveyed along the toner supply path 302 by the toner conveying member 320 is supplied into the toner chamber 203 through a toner supply hole 303 provided at an end portion of the toner supply path 302.

Referring to FIG. 3, a toner level sensor 204 may be provided in the toner chamber 203. The toner level sensor 204 detects a toner level inside the toner chamber 203. The toner level sensor 204 may be arranged at a lower position than the toner receiving unit 300. For example, the toner level sensor 204 may be located at a lower position than the toner supply hole 303. The toner level sensor 204 may be implemented with, for example, an optical sensor, a capacitive sensor, or the like. When the toner level sensor 204 detects that the toner level inside the toner chamber 203 is lower than or equal to a reference level, a controller (not shown) may drive a toner supply motor (not shown) to supply toner from the toner cartridge 40 to the toner chamber 203.

An image forming operation may be performed in a state in which the developing roller 22 approaches the photosensitive drum 21, for example, a state in which the developing roller 22 comes into contact with the photosensitive drum 21 to form a developing nip, as shown by a solid profile of the development unit 200 in FIG. 2. While no image forming operation is performed, the developing roller 22 may be separated from the photosensitive drum 21 to reduce the risk of deformation or damage to the developing roller 22 and the photosensitive drum 21, as shown by a dotted profile of the development unit 200 in FIG. 2. To this end, the development unit 200 may be pivotably supported by the photosensitive unit 100. The photosensitive unit 100 may include a frame 120. The development unit 200 may be pivotably supported by the frame 120. The development unit 200 may be pivoted with the toner receiving unit 300. For example, the toner receiving unit 300 may be coaxial with a pivot axis PX of the development unit 200. A portion of the toner receiving unit 300 that is supported by the frame 120 of the photosensitive unit 100 may have a cylindrical shape centered on the pivot axis PX. An elastic member 101 applies an elastic force to the development unit 200 to cause pivoting of the development unit 200 in a direction in which the developing roller 22 approaches the photosensitive drum 21. For example, the elastic member 101 may be implemented with a tension coil spring having one end portion and the other end portion thereof connected to the photosensitive unit 100 and the development unit 200, respectively.

As an example, the toner receiving unit 300 may include an outer circumference portion 310 protruding outward from a side portion 121 of the photosensitive unit 100. The outer circumference portion 310 may have a cylindrical shape centered on the pivot axis PX. The outer circumference portion 310 may be inserted into a through hole 122 provided at the side portion 121 of the frame 120 of the photosensitive unit 100. The toner inlet 301 may be provided in the outer circumference portion 310. According to this configuration, a position of the toner receiving unit 300 does not change even when the development unit 200 is pivoted with respect to the photosensitive unit 100.

Figure 4:
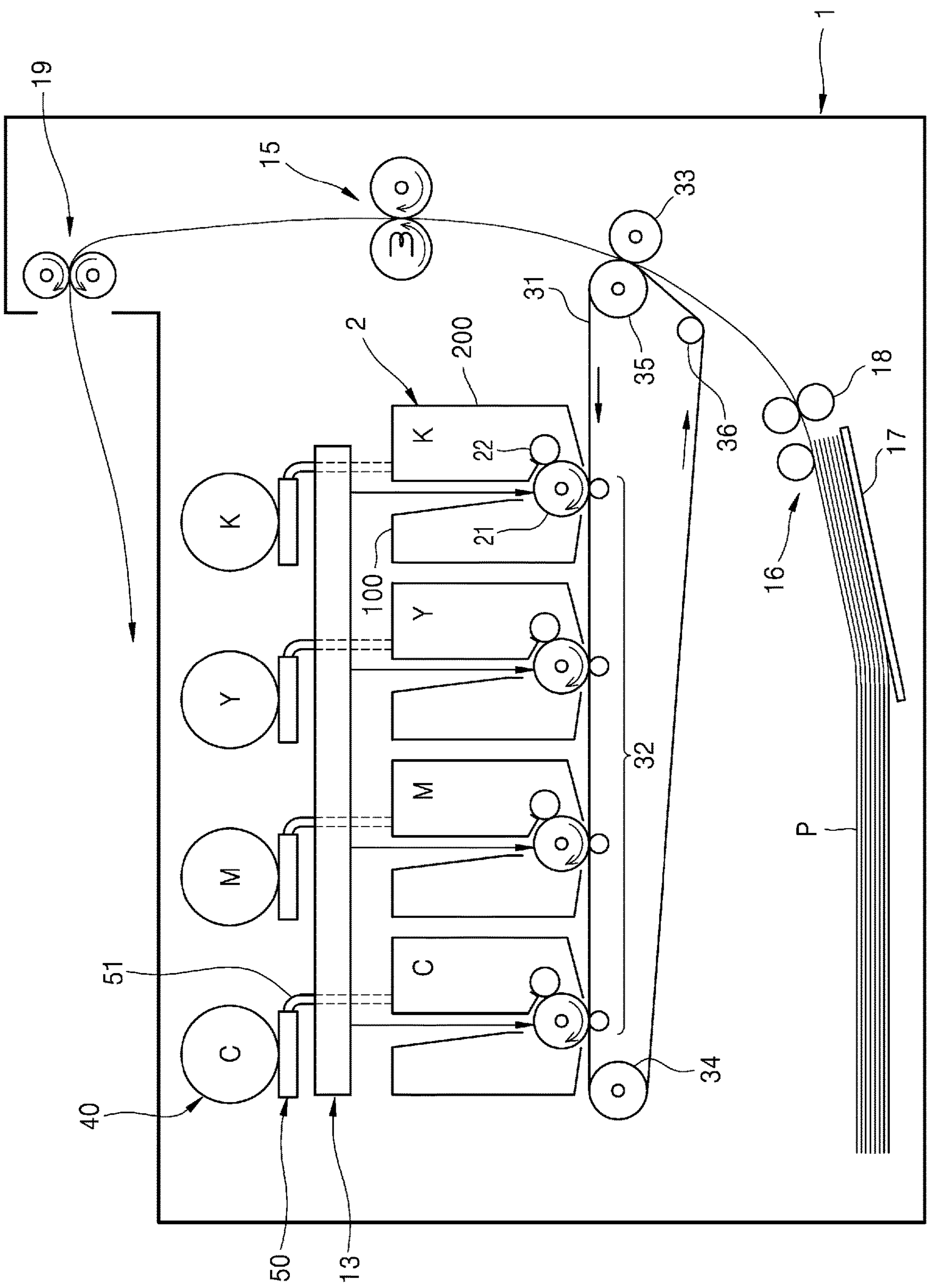
FIG. 4 is a schematic configuration diagram of an example of an image forming apparatus to which an example of the process cartridge shown in FIGS. 1 to 3 is applied.

FIG. 4 is a schematic configuration diagram of an example of an image forming apparatus to which an example of the process cartridge 2 shown in FIGS. 1 to 3 is applied. Referring to FIG. 4, the image forming apparatus may include the process cartridge 2, an optical scanner 13, a transfer unit, and a fixing unit 15.

The configuration of the process cartridge 2 is the same as described above. For color printing, the process cartridge 2 may include four process cartridges 2C, 2M, 2Y, and 2K for forming toner images of cyan (C), magenta (M), yellow (Y), and black (K) colors, respectively. Hereinafter, unless otherwise stated, reference numerals respectively labeled with C, M, Y, and K refer to components for developing agents of cyan (C), magenta (M), yellow (Y), and black (K) colors, respectively. The optical scanner 13 irradiates light modulated in correspondence with image information of cyan (C), magenta (M), yellow (Y), and black (K) colors to photosensitive drums 21 of the process cartridges 2C, 2M, 2Y, and 2K, respectively, thereby forming electrostatic latent images corresponding to cyan (C), magenta (M), yellow (Y), and black (K) colors on the photosensitive drums 21. An example of the optical scanner 13 may be a laser scanning unit (LSU) using a laser diode as a light source.

The transfer unit transfers a toner image formed on the photosensitive drum 21 to a print medium P. In the present example, an intermediate transfer-type transfer unit is employed. As an example, the transfer unit may include an intermediate transfer belt 31, intermediate transfer rollers 32, and a transfer roller 33. The intermediate transfer belt 31 temporarily receives toner images developed on four photosensitive drums 21. The intermediate transfer belt 31 is supported by support rollers 34, 35, and 36 and circulated. Four intermediate transfer rollers 32 are arranged at positions facing the four photosensitive drums 21 with the intermediate transfer belt 31 therebetween. An intermediate transfer bias voltage for intermediately transferring the toner images developed on the photosensitive drums 21 to the intermediate transfer belt 31 is applied to the intermediate transfer rollers 32. Instead of the intermediate transfer rollers 32, a corona transfer unit or a pin scorotron-type transfer unit may be employed. The transfer roller 33 is arranged to face the intermediate transfer belt 31. A transfer bias voltage for transferring the toner images transferred to the intermediate transfer belt 31 to the print medium P is applied to the transfer roller 33. The fixing unit 15 applies heat and/or pressure to the toner images transferred to the print medium P to fix the toner images to the print medium P. A shape of the fixing unit 15 is not limited to the example shown in FIG. 4.

According to the above configuration, the optical scanner 13 scans four light beams modulated in correspondence with image information of each color to the four photosensitive drums 21, thereby forming an electrostatic latent image on each of the four photosensitive drums 21. The electrostatic latent images of the four photosensitive drums 21 are developed into visible C, M, Y, and K toner images by C, M, Y, and K toners supplied from four toner chambers 203. The developed toner images are sequentially and intermediately transferred to the intermediate transfer belt 31. The print medium P loaded on a loading table 17 is transported between the transfer roller 33 and the intermediate transfer belt 31 by a pickup roller 16 and a transporting roller 18. The toner images intermediately transferred onto the intermediate transfer belt 31 are transferred to the print medium P by the transfer bias voltage applied to the transfer roller 33. As the print medium P passes through the fixing unit 15, the toner image is fixed to the print medium P by heat and pressure. The print medium P on which fixing is completed is discharged by a discharge roller 19.

An example of the image forming apparatus may include the toner cartridge 40. The toner cartridge 40 contains toner. The toner cartridge 40 is connected to the toner receiving unit 300 of the development unit 200 by the toner supply unit 50. The toner supply unit 50 may include a toner supply duct 51. The toner supply duct 51 receives toner from the toner cartridge 40 and supplies the toner to the toner receiving unit 300. The process cartridge 2 may be attached to or detached from the main body 1 of the image forming apparatus. When the process cartridge 2 is mounted on the main body 1, the toner receiving unit 300 is connected to the toner supply duct 51.

With the process cartridge 2 of some examples, the toner receiving unit 300 and the toner supply duct 51 each has a cylindrical surface centered on the pivot axis PX. As these cylindrical surfaces face each other, the toner receiving unit 300 and the toner supply duct 51 are connected to each other. Hereinafter, examples of a connection structure between the toner receiving unit 300 and the toner supply unit 50 will be described.

Figure 5:
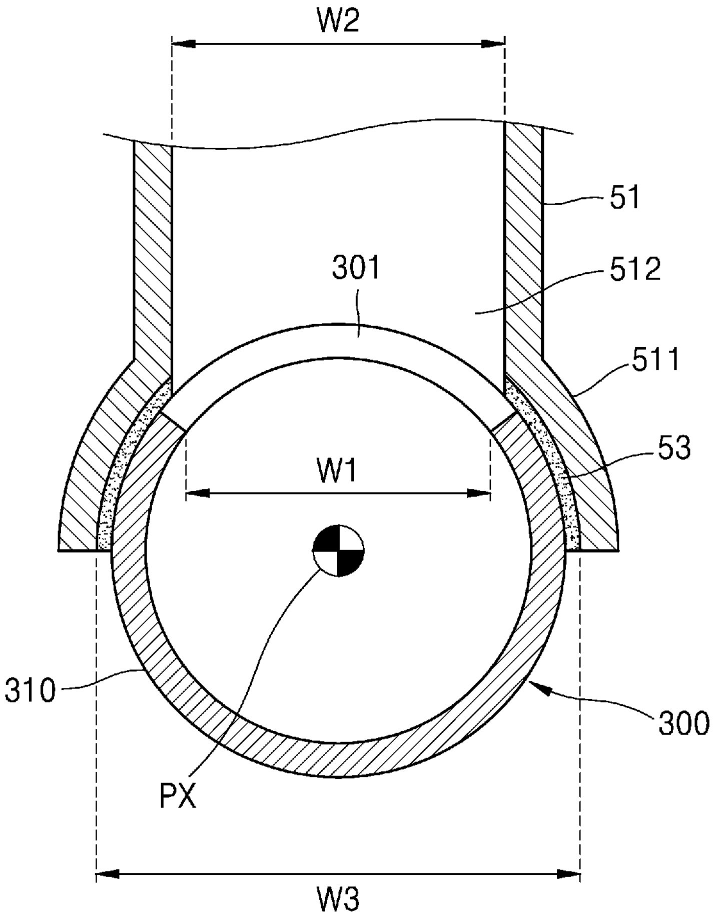
FIG. 5 is a schematic cross-sectional view of an example of a connection structure between a toner receiving unit and a toner supply unit.

FIG. 5 is a schematic cross-sectional view of an example of a connection structure between the toner receiving unit 300 and the toner supply unit 50. Referring to FIGS. 3 and 5, the toner receiving unit 300 includes the outer circumference portion 310 protruding from the side portion 121 of the photosensitive unit 100. The outer circumference portion 310 has a cylindrical shape centered on the pivot axis PX. The outer circumference portion 310 is provided with the toner inlet 301. The toner supply duct 51 may at least partially surround the outer circumference portion 310 to cover the toner inlet 301. An end portion 511 of the toner supply duct 51 has a shape complementary to the outer circumference portion 310. For example, the end portion 511 of the toner supply duct 51 may have a cylindrical shape partially surrounding the outer circumference portion 310. When the process cartridge 2 is mounted on the main body 1 of the image forming apparatus, the end portion 511 of the toner supply duct 51 partially surrounds the outer circumference portion 310 of the toner receiving unit 300. A toner outlet 512 provided at the end portion 511 of the toner supply duct 51 is aligned with the toner inlet 301 provided at the outer circumference portion 310. A width W1 of the toner inlet 301 may be greater than or slightly less than a width W2 of the toner outlet 512. The width W1 of the toner inlet 301 may be less than a width W3 of the end portion 511 of the toner supply duct 51. The width W1 of the toner inlet 301 may be determined such that the toner inlet 301 does not deviate from the width W3 of the end portion 511 of the toner supply duct 51 even when the development unit 200 is rotated. A sealing member 53 may be provided at the end portion 511 of the toner supply duct 51. The sealing member 53 blocks a gap between the end portion 511 of the toner supply duct 51 and the outer circumference portion 310 to prevent toner leakage. The sealing member 53 may be made of, for example, a sponge, felt, or the like.

When the development unit 200 is pivoted with respect to the pivot axis PX, the toner receiving unit 300 is pivoted together with the development unit 200. Because the outer circumference portion 310 of the toner receiving unit 300 has a cylindrical shape centered on the pivot axis PX, and the end portion 511 of the toner supply duct 51 has a shape complementary to the outer circumference portion 310, a connection between the end portion 511 of the toner supply duct 51 and the outer circumference portion 310 may be stably maintained even when the development unit 200 is rotated. Accordingly, toner leakage through a gap between the toner receiving unit 300 and the toner supply duct 51 may be prevented, and toner may be stably supplied from the toner cartridge 40 to the toner chamber 203. Also, because there is no relative positional change between the outer circumference portion 310 of the toner receiving unit 300 and the end portion 511 of the toner supply duct 51 when the development unit 200 is pivoted, a pivoting operation of the development unit 200 may be stably performed. Also, because the developing nip is marginally affected by the connection structure between the toner supply unit 50 and the toner receiving unit 300, stable image quality may be realized. Because the end portion 511 of the toner supply duct 51 to which the sealing member 53 is attached has a partial cylindrical shape, the elastic force of the sealing member 53 is directed toward the pivot axis PX. The elastic force of the sealing member 53 does not act in a direction in which the development unit 200 is pivoted. Accordingly, the developing nip may be stably maintained while an image forming operation is performed, and thus, stable image quality may be realized.

Figure 6:
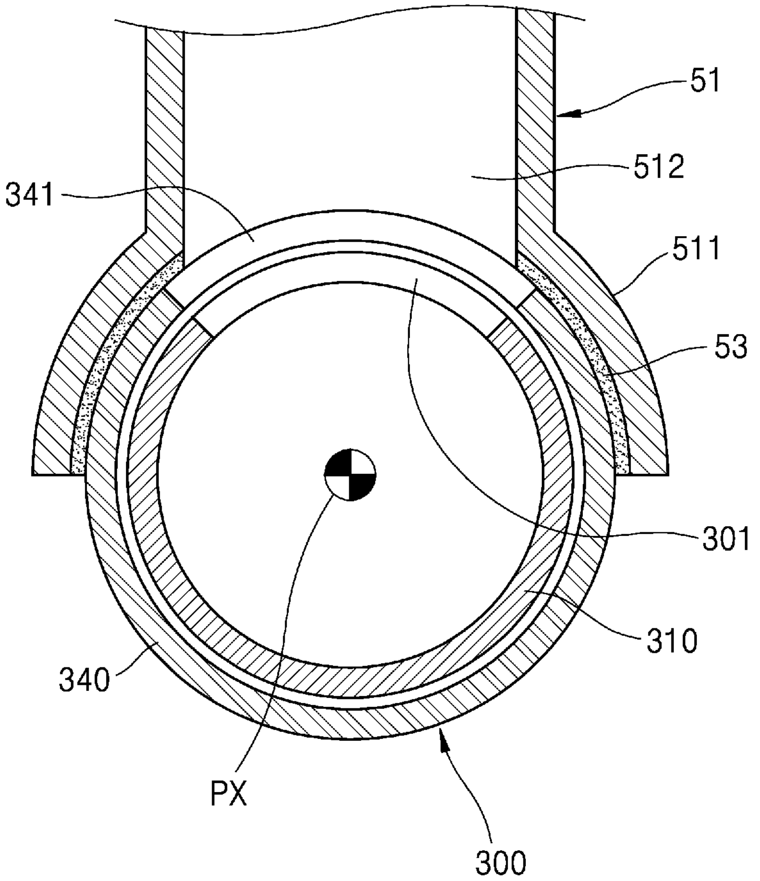
FIG. 6 is a schematic cross-sectional view of an example of a connection structure between a toner receiving unit and a toner supply unit.

FIG. 6 is a schematic cross-sectional view of an example of a connection structure according to further examples between the toner receiving unit 300 and the toner supply unit 50. The connection structure of FIG. 6 is different from the example connection structure shown in FIG. 5 in that a cover portion 340 is arranged between the outer circumference portion 310 of the toner receiving unit 300 and the end portion 511 of the toner supply duct 51. Hereinafter, the difference will be mainly described. Referring to FIG. 6, the cover portion 340 is supported by the side portion 121 of the photosensitive unit 100. The cover portion 340 has a hollow cylindrical shape, and the outer circumference portion 310 of the toner receiving unit 300 is pivotably inserted into the cover portion 340. The cover portion 340 is provided with a toner supply hole 341. The end portion 511 of the toner supply duct 51 has a shape complementary to the cover portion 340. When the process cartridge 2 is mounted on the main body 1 of the image forming apparatus, the end portion 511 of the toner supply duct 51 partially surrounds the cover portion 340. The toner outlet 512 provided at the end portion 511 of the toner supply duct 51 is aligned with a toner supply hole 341 provided at the cover portion 340. When the development unit 200 is pivoted with respect to the pivot axis PX, the toner receiving unit 300 is pivoted together with the development unit 200. The outer circumference portion 310 of the toner receiving unit 300 has a cylindrical shape centered on the pivot axis PX, and is rotated inside the cover portion 340. The cover portion 340 is not rotated. Accordingly, the end portion 511 of the toner supply duct 51 may be stably maintained in a state of being connected to the cover portion 340.

Figure 7:
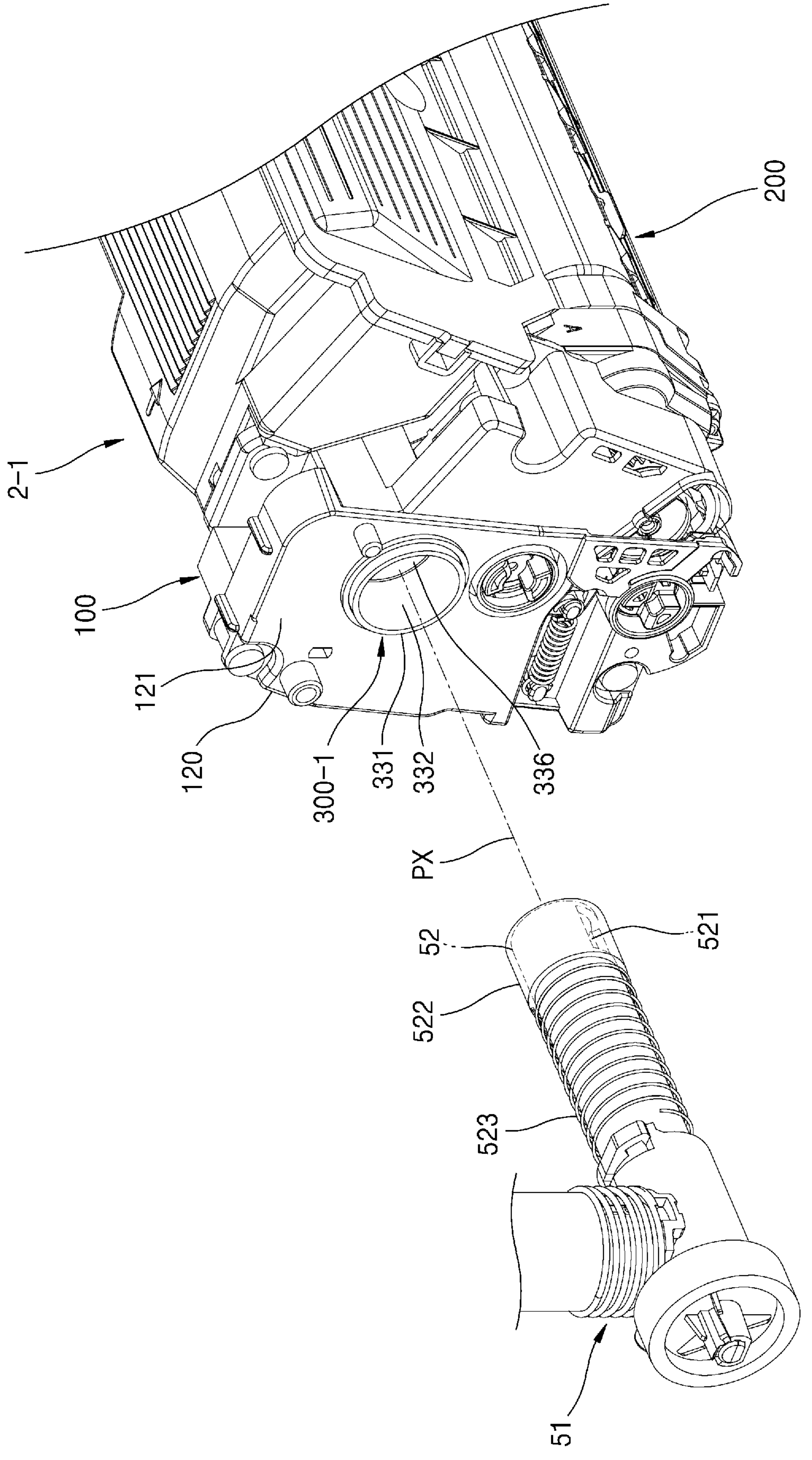
FIG. 7 is a schematic perspective view of an example of a process cartridge.
Figure 8:
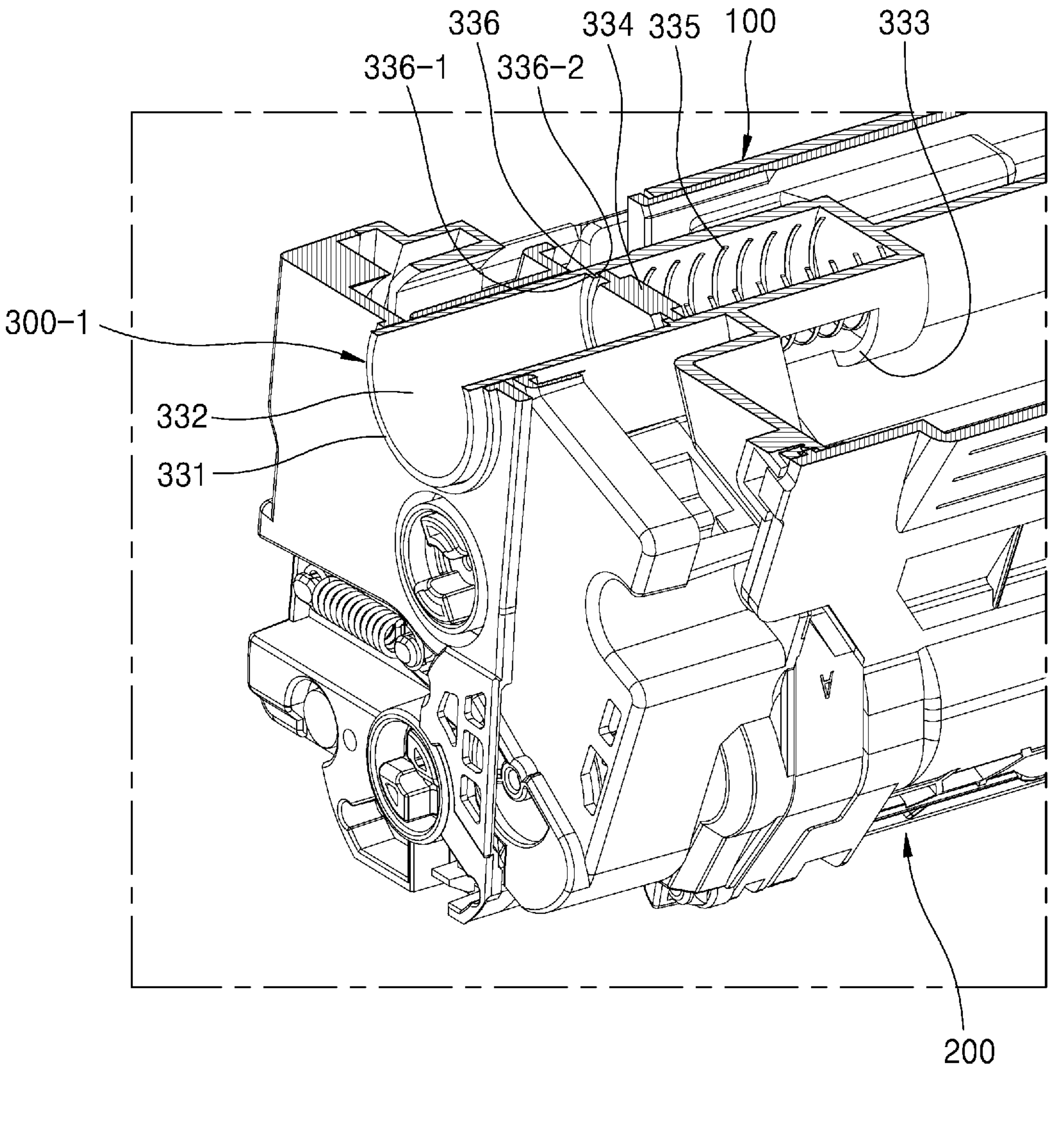
FIG. 8 is a partial cutaway perspective view illustrating in detail a toner receiving unit in an example of the process cartridge shown in FIG. 7.
Figure 9:
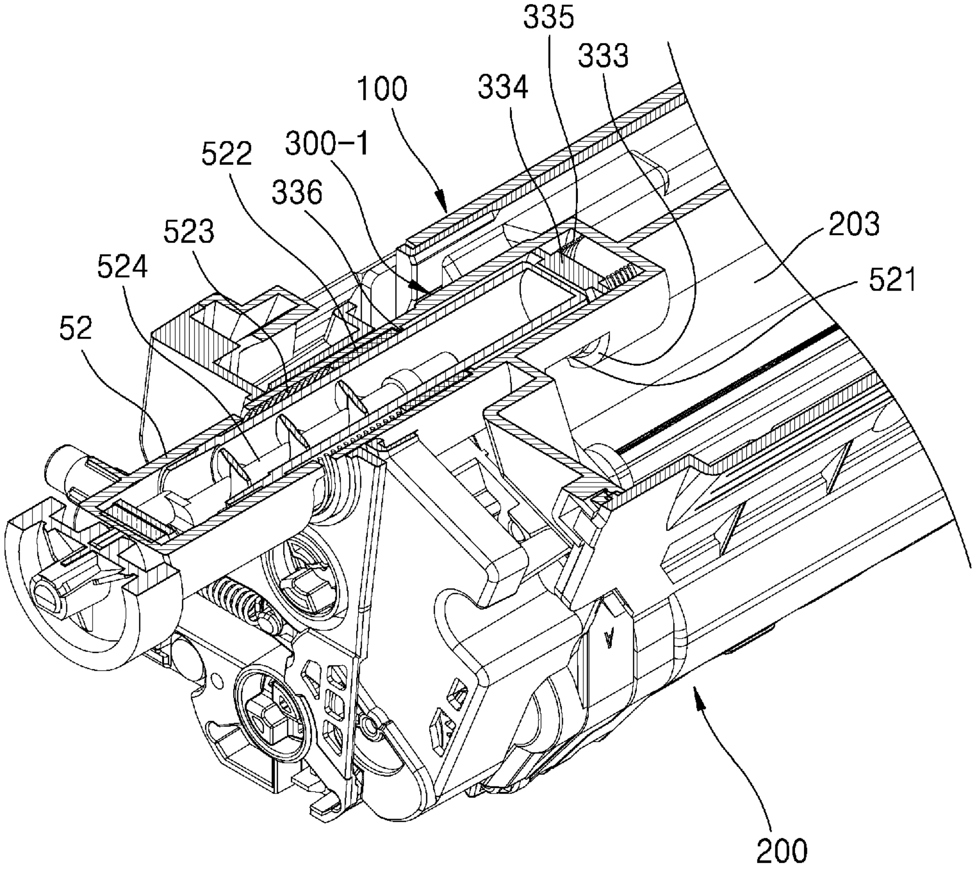
FIG. 9 is a partial cutaway perspective view illustrating a state in which an example of the process cartridge shown in FIG. 7 is mounted on a main body of an image forming apparatus.

In the above example, because the toner receiving unit 300 and the toner supply duct 51 each has a partial cylindrical surface, and these partial cylindrical surfaces face each other, the toner receiving unit 300 and the toner supply duct 51 are connected to each other. The toner receiving unit 300 and the toner supply duct 51 may each have a complete cylindrical surface. FIG. 7 is a schematic perspective view of an example of a process cartridge 2-1. The toner supply duct 51 is also shown in FIG. 7. FIG. 8 is a partial cutaway perspective view illustrating in detail a toner receiving unit 300-1 in an example of the process cartridge 2-1 shown in FIG. 7. FIG. 9 is a partial cutaway perspective view illustrating a state in which the process cartridge 2-1 is mounted on the main body 1 of an image forming apparatus. The process cartridge 2-1 of the present example is different from the process cartridge 2 shown in FIGS. 1 to 3 in that the toner receiving unit 300-1 is employed. Hereinafter, the difference will be mainly described. Referring to FIGS. 7 to 9, the toner receiving unit 300-1 includes an opening portion 331 and an extension portion 332. The opening portion 331 is exposed from the side portion 121 of the photosensitive unit 100. The extension portion 332 extends from the opening portion 331 into the toner chamber 203. A toner inlet 333 may be provided near an end portion of the extension portion 332, the end portion being located inside the toner chamber 203. The toner receiving unit 300-1 has a hollow cylindrical shape centered on the pivot axis PX of the development unit 200 as a whole. The toner receiving unit 300-1 may include an inlet shutter 334. The inlet shutter 334 is installed in the extension portion 332. The inlet shutter 334 may be moved to a blocking position (see FIG. 8) for providing blockage between the opening portion 331 and the toner inlet 333, and an open position (see FIG. 9) for enabling communication between the opening portion 331 and the toner inlet 333. An elastic member 335 applies an elastic force to the inlet shutter 334 in a direction to place the inlet shutter 334 at the blocking position. The elastic member 335 may be implemented with, for example, a compression coil spring. A protruding portion 336 protruding inwardly may be provided in the extension portion 332. An end portion 336-1 of the protruding portion 336 functions as an interference portion for moving a supply shutter 522 described below, and the other end portion 336-2 of the protruding portion 336 functions as a stopper for holding the inlet shutter 334 in the blocking position.

Referring to FIGS. 7 and 9, the toner supply duct 51 includes a toner supply nozzle 52. The toner supply nozzle 52 may have a cylindrical shape extending in a direction of the pivot axis PX. A toner outlet 521 is provided at an end portion of the toner supply nozzle 52. The supply shutter 522 opens and closes the toner outlet 521. For example, the supply shutter 522 is movable along an outer circumference of the toner supply nozzle 52 in the direction of the pivot axis PX. The supply shutter 522 may be moved to a first position (see FIG. 7) for blocking the toner outlet 521 and a second position (see FIG. 9) for opening the toner outlet 521. An elastic member 523 applies an elastic force to the supply shutter 522 in a direction in which the supply shutter 522 is moved to the first position for blocking the toner outlet 521. The elastic member 523 may be implemented with, for example, a compression coil spring. A toner conveying member 524 may be arranged inside the toner supply nozzle 52. The toner conveying member 524 may be, for example, an auger. The toner conveying member 524 conveys toner supplied from the toner cartridge 40 into the toner supply nozzle 52 toward the toner outlet 521.

During an operation in which the process cartridge 2-1 is mounted on the main body 1 of the image forming apparatus, the toner supply nozzle 52 is inserted into the extension portion 332 through the opening portion 331. The inlet shutter 334 is located at the blocking position. When the end portion of the toner supply nozzle 52 comes into contact with the inlet shutter 334, the inlet shutter 334 is pushed by the toner supply nozzle 52 and moved to the open position. When the supply shutter 522 at the first position comes into contact with the end portion 336-1 of the protruding portion 336, the supply shutter 522 is moved to the second position for opening the toner outlet 521, while being pushed in a direction opposite to the elastic force of the elastic member 523. When the process cartridge 2-1 is fully mounted on the main body 1, as shown in FIG. 9, the inlet shutter 334 is located at the open position, and the supply shutter 522 is located at the second position for opening the toner outlet 521. The toner outlet 521 is aligned with the toner inlet 333. Thus, a connection between the toner supply unit 50 and the process cartridge 2-1 is completed. When the development unit 200 is pivoted with respect to the pivot axis PX, the toner receiving unit 300-1 is pivoted together with the development unit 200. Because the extension portion 332 of the toner receiving unit 300-1 has a hollow cylindrical shape centered on the pivot axis PX, and the toner supply nozzle 52 having a cylindrical shape is inserted inside the extension portion 332, the toner supply nozzle 52 is maintained in a state of being inserted inside the extension portion 332 even when the development unit 200 is rotated. Accordingly, toner leakage through a gap between the toner receiving unit 300-1 and the toner supply nozzle 52 may be prevented, and toner may be stably supplied from the toner cartridge 40 to the toner chamber 203.

Figure 10:
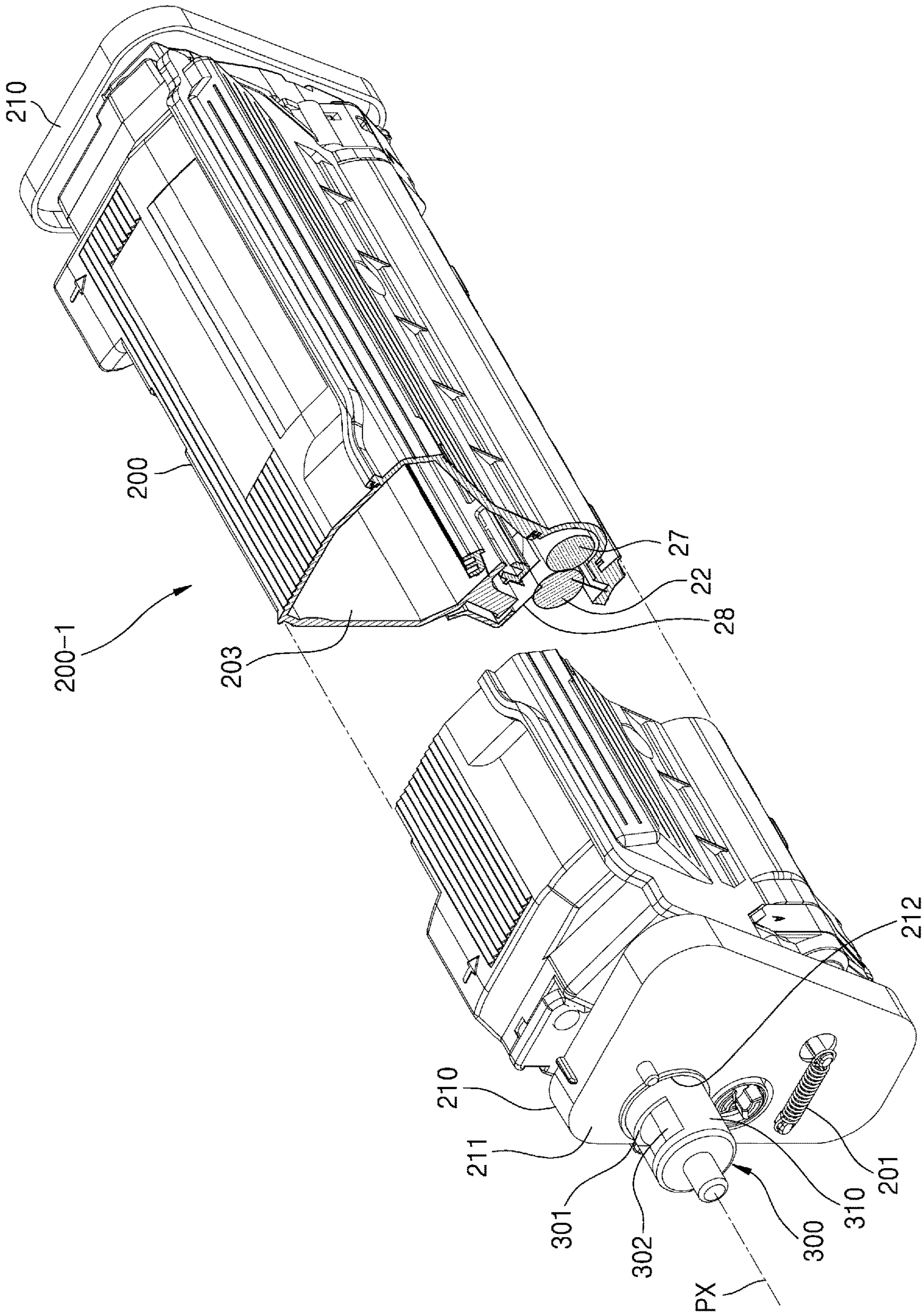
FIG. 10 is a schematic perspective view of an example of a development cartridge.
Figure 11:
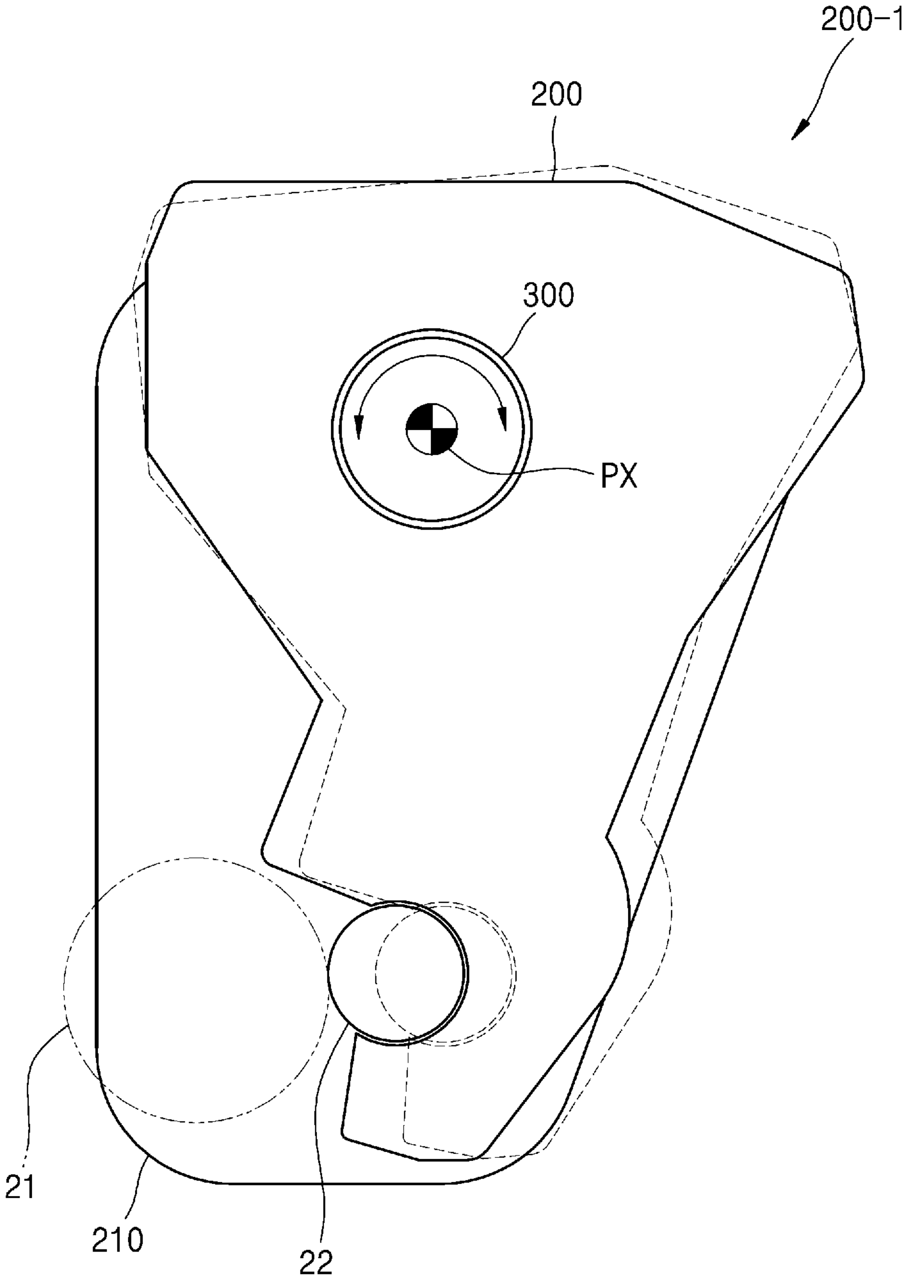
FIG. 11 is a side view of an example of the development cartridge shown in FIG. 10.

A development unit may be attached to or detached from the main body 1 of the image forming apparatus separately from a photosensitive unit. This type of development unit is referred to as a development cartridge. FIG. 10 is a schematic perspective view of an example of a development cartridge 200-1. FIG. 11 is a side view of an example of the development cartridge 200-1 shown in FIG. 10. Referring to FIGS. 10 and 11, the development cartridge 200-1 may include a side bracket 210 and the development unit 200. The development unit 200 may be the same as described with reference to FIGS. 1 to 3. For example, the development unit 200 may include the developing roller 22, the toner chamber 203, the toner receiving unit 300 extending from the toner chamber 203 to form the toner supply path 302 to the toner chamber 203, and the toner inlet 301 provided in the toner receiving unit 300. The development unit 200 may be pivotably supported by the side bracket 210 with respect to the toner receiving unit 300. The toner receiving unit 300 is provided with the toner inlet 301 through which toner is introduced. The toner conveying member 320 may be provided inside the toner receiving unit 300. The toner conveying member 320 conveys the toner introduced into the toner receiving unit 300, for example, the toner supply path 302, through the toner inlet 301 to the toner chamber 203. The toner conveying member 320 may include, for example, an auger. The toner conveyed along the toner supply path 302 by the toner conveying member 320 is supplied into the toner chamber 203 through the toner supply hole 303 provided at the end portion of the toner supply path 302.

An image forming operation may be performed in a state in which the developing roller 22 approaches the photosensitive drum 21, for example, a state in which the developing roller 22 comes into contact with the photosensitive drum 21 to form a developing nip, as shown by a solid profile of the development unit 200 in FIG. 11. While no image forming operation is performed, the developing roller 22 may be separated from the photosensitive drum 21 to reduce the risk of deformation or damage to the developing roller 22 and the photosensitive drum 21, as shown by a dotted profile of the development unit 200 in FIG. 11. To this end, the development unit 200 may be pivotably supported by the side bracket 210. The development unit 200 may be pivoted with the toner receiving unit 300. For example, the toner receiving unit 300 may be coaxial with the pivot axis PX of the development unit 200. A portion of the toner receiving unit 300 supported by the side bracket 210 may have a cylindrical shape centered on the pivot axis PX. An elastic member 201 applies an elastic force to the development unit 200 such that the development unit 200 is pivoted in the direction in which the developing roller 22 approaches the photosensitive drum 21.

As an example, the toner receiving unit 300 may include the outer circumference portion 310 protruding outward from a side portion 211 of the side bracket 210. The outer circumference portion 310 may have a cylindrical shape centered on the pivot axis PX. The outer circumference portion 310 may be inserted into a through hole 212 provided at the side portion 211 of the side bracket 210. The toner inlet 301 may be provided in the outer circumference portion 310. As a connection structure between the toner receiving unit 300, for example, the outer circumference portion 310, and the toner supply duct 51, the connection structure shown in FIG. 5 or 6 may be employed. According to this configuration, a position of the toner receiving unit 300 does not change even when the development unit 200 is pivoted with respect to the side bracket 210. Accordingly, toner leakage through a gap between the outer circumference portion 310 and the toner supply duct 51 may be prevented, and toner may be stably supplied from the toner cartridge 40 to the toner chamber 203.

Figure 12:
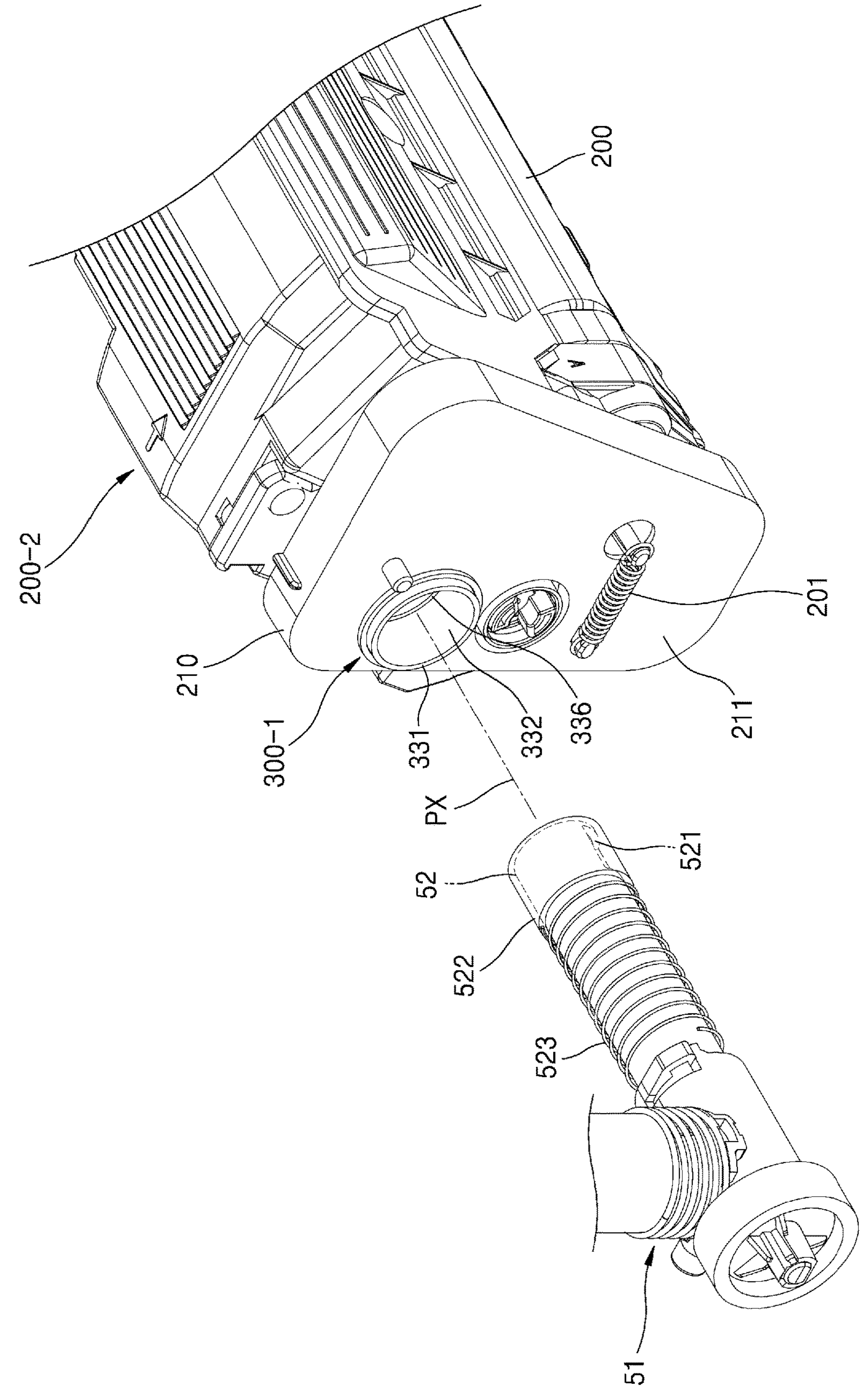
FIG. 12 is a schematic perspective view of an example of a development cartridge.

FIG. 12 is a schematic perspective view of an example of a development cartridge 200-2. The toner supply duct 51 is also shown in FIG. 12. The development cartridge 200-2 of the present example is different from the development cartridge 200-1 shown in FIGS. 10 and 11 in that the toner receiving unit 300-1 shown in FIGS. 7 to 9 is employed. Hereinafter, the difference will be mainly described. Referring to FIGS. 7 to 9 and 12, the toner receiving unit 300-1 includes the opening portion 331 and the extension portion 332. The opening portion 331 is exposed from the side portion 211 of the side bracket 210. The extension portion 332 extends from the opening portion 331 into the toner chamber 203. The toner inlet 333 may be provided near the end portion of the extension portion 332, the end portion being located inside the toner chamber 203. The toner receiving unit 300-1 has a hollow cylindrical shape centered on the pivot axis PX of the development unit 200 as a whole.

The inlet shutter 334 is installed in the extension portion 332 to be moved to a blocking position for providing a blockage between the opening portion 331 and the toner inlet 333 and an open position for enabling communication between the opening portion 331 and the toner inlet 333. The elastic member 335 applies an elastic force to the inlet shutter 334 in a direction in which the inlet shutter 334 is located at the blocking position. The end portion 336-1 of the protruding portion 336 protruding inward in the extension portion 332 functions as an interference portion for moving the supply shutter 522, and the other end portion 336-2 of the protruding portion 336 functions as a stopper for holding the inlet shutter 334 in the blocking position.

The toner supply duct 51 includes the toner supply nozzle 52 having a cylindrical shape extending in the direction of the pivot axis PX, and the toner outlet 521 is provided at the end portion of the toner supply nozzle 52. The supply shutter 522 opens and closes the toner outlet 521. For example, the supply shutter 522 may be moved to the first position (see FIG. 7) for blocking the toner outlet 521 and the second position (see FIG. 9) for opening the toner outlet 521 along the outer circumference of the toner supply nozzle 52 in the direction of the pivot axis PX. The elastic member 523 applies an elastic force to the supply shutter 522 in a direction in which the supply shutter 522 is moved to the second position. The toner conveying member 524 for conveying toner inside the toner supply nozzle 52 toward the toner outlet 521 may be arranged inside the toner supply nozzle 52.

During an operation in which the development cartridge 200-2 is mounted on the main body 1 of the image forming apparatus, the toner supply nozzle 52 is inserted into the extension portion 332 through the opening portion 331. When the end portion of the toner supply nozzle 52 comes into contact with the inlet shutter 334 located at the blocking position, the inlet shutter 334 is pushed by the toner supply nozzle 52 and moved to the open position. When the development cartridge 200-2 is further inserted into the main body 1 while the supply shutter 522 located at the first position is in contact with the end portion 336-1 of the protruding portion 336, The supply shutter 522 is moved to the second position for opening the toner outlet 521. Thus, a connection between the toner supply unit 50 and the development cartridge 200-2 is completed. Because the extension portion 332 of the toner receiving unit 300-1 has a hollow cylindrical shape centered on the pivot axis PX, and the toner supply nozzle 52 having a cylindrical shape is inserted inside the extension portion 332, the toner supply nozzle 52 is maintained in a state of being inserted inside the extension portion 332 even when the development unit 200 is pivoted about the pivot axis PX. Accordingly, toner leakage through a gap between the toner receiving unit 300-1 and the toner supply nozzle 52 may be prevented, and toner may be stably supplied from the toner cartridge 40 to the toner chamber 203.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A process cartridge comprising:

a photosensitive unit comprising a photosensitive drum; and a development unit comprising a developing roller, a toner chamber, a toner receiving unit extending from the toner chamber to form a toner supply path to the toner chamber, and a toner inlet provided in the toner receiving unit, wherein the development unit comprising the toner receiving unit is pivotably supported by the photosensitive unit, the development unit pivotable in a direction in which the developing roller approaches or is separated from the photosensitive drum, and wherein the toner receiving unit is located along a pivot axis of the development unit, wherein the toner receiving unit comprises an opening portion exposed from a side portion of the photosensitive unit, and an extension portion extending from the opening portion into the toner chamber, and the toner inlet is provided near an end portion of the extension portion, the end portion being located inside the toner chamber.

2. The process cartridge of claim 1, wherein the toner receiving unit comprises an outer circumference portion protruding outwardly from a side portion of the photosensitive unit and having a cylindrical shape centered on the pivot axis of the development unit, and the toner inlet is provided in the outer circumference portion.

3. The process cartridge of claim 2, comprising a cover portion supported by the side portion of the photosensitive unit and into which the outer circumference portion is pivotably inserted, wherein the cover portion is provided with a toner supply hole aligned with the toner inlet.

4. The process cartridge of claim 1, comprising a shutter installed in the extension portion, the shutter to open and close the toner inlet.

5. A development cartridge comprising:

a side bracket; and a development unit comprising a developing roller, a toner chamber, a toner receiving unit extending from the toner chamber to form a toner supply path to the toner chamber, and a toner inlet provided in the toner receiving unit, wherein the development unit comprising the toner receiving unit is pivotably supported by the side bracket, and wherein the toner receiving unit is located along a pivot axis of the development unit, wherein the toner receiving unit comprises an opening portion exposed from a side portion of the side bracket, and an extension portion extending from the opening portion into the toner chamber, and the toner inlet is provided near an end portion of the extension portion, the end portion being located inside the toner chamber.

6. The development cartridge of claim 5, wherein the toner receiving unit comprises an outer circumference portion protruding outwardly from a side portion of the side bracket and having a cylindrical shape centered on a pivot axis of the toner chamber, and the toner inlet is provided in the outer circumference portion.

7. An image forming apparatus comprising:

a toner cartridge;

a photosensitive drum;

a development unit comprising a developing roller, a toner chamber, a toner receiving unit extending from the toner chamber to form a toner supply path to the toner chamber, and a toner inlet provided in the toner receiving unit; and a toner supply unit to receive toner from the toner cartridge and supply the toner to the toner chamber through the toner inlet, wherein the development unit comprising the toner receiving unit is pivotable in a direction in which the developing roller approaches or is separated from the photosensitive drum, and wherein the toner receiving unit is located along a pivot axis of the development unit, wherein the toner receiving unit comprises an opening portion exposed from a side portion of the side bracket, and an extension portion extending from the opening portion into the toner chamber, and the toner inlet is provided near an end portion of the extension portion, the end portion being located inside the toner chamber.

8. The image forming apparatus of claim 7, comprising a process cartridge comprising:

a photosensitive unit comprising the photosensitive drum, and the development unit pivotably supported by the photosensitive unit.

9. The image forming apparatus of claim 8, wherein the toner receiving unit comprises an outer circumference portion protruding outwardly from a side portion of the photosensitive unit and having a cylindrical shape centered on the pivot axis of the development unit, the toner inlet is provided in the outer circumference portion, and the toner supply unit comprises a toner supply duct at least partially surrounding the outer circumference portion to cover the toner inlet.

10. The image forming apparatus of claim 8, wherein the toner receiving unit comprises an opening portion exposed from a side portion of the photosensitive unit, and an extension portion extending from the opening portion into the toner chamber, the toner inlet is provided near an end portion of the extension portion, the end portion being located inside the toner chamber, and the toner supply unit comprises a toner supply nozzle inserted into the extension portion through the opening portion.

11. The image forming apparatus of claim 7, comprising a development cartridge comprising the development unit and a side bracket on which the development unit comprising the toner receiving unit is pivotably supported.

12. The image forming apparatus of claim 11, wherein the toner receiving unit comprises an outer circumference portion protruding outward from a side portion of the side bracket and having a cylindrical shape centered on a pivot axis of the toner chamber, the toner inlet is provided in the outer circumference portion, and the toner supply unit comprises a toner supply duct at least partially surrounding the outer circumference portion to cover the toner inlet.

* * * * *